INVENTOR.
Jerry E. Losey

United States Patent Office 3,483,347
Patented Dec. 9, 1969

3,483,347
ELECTRICAL DISCHARGE MACHINING
POWER SUPPLY
Jerry E. Losey, Fort Thomas, Ky., assignor to The Cincinnati Milling Machine, Co., Cincinnati, Ohio, a corporation of Ohio
Filed Dec. 5, 1966, Ser. No. 599,140
Int. Cl. B23k 9/16
U.S. Cl. 219—69                                   4 Claims

ABSTRACT OF THE DISCLOSURE

An apparatus for electrical discharge machining having an electrical discharge testing circuit determining the quality of machining sparks and controlling the application of power to a machining gap between a tool electrode and a conductive workpiece. A sensing circuit is provided in which an output signal, indicative of a bad discharge, is delayed for a preset period so that a series of bad discharges is detected before the initial output signal is utilized to interrupt the pulsed power supplied to the gap for a predetermined period of time.

SUMMARY

In its preferred form, this invention is included in a combination with a high frequency and high energy direct current pulsed power supply in an electrical discharge machining apparatus, hereinafter EDM apparatus. It includes a testing circuit connected directly to the tool electrode at the machining gap to obtain a feedback of discharge information which is compared with a preset standard to determine its quality. Each discharge is tested against a preset go and no-go standard and if a no-go condition is detected an output signal is produced to indicate the bad discharge. Another circuit is provided in which this output signal is delayed for a preset period so that a series of bad discharges is detected before the initial output signal is utilized to interrupt the pulsed power supplied to the gap for a predetermined period of time. This delay allows the process to clear itself in the event that only a temporary condition is present at the gap to cause a bad discharge. If a good discharge is detected before the power is interrupted but after the detection of a bad discharge, the circuit is reset and the detected bad discharge will never cause the power to be interrupted. Thus a predetermined number of bad discharges in succession must occur before the power is removed from the machining gap. When the power is removed, the gap voltage drops and by means of conventional EDM feed mechanism, the tool electrode is caused first to be moved from the work and then to be restarted toward it when the power is reapplied, thus restarting the process.

DRAWINGS

DESCRIPTION

Figure 1:
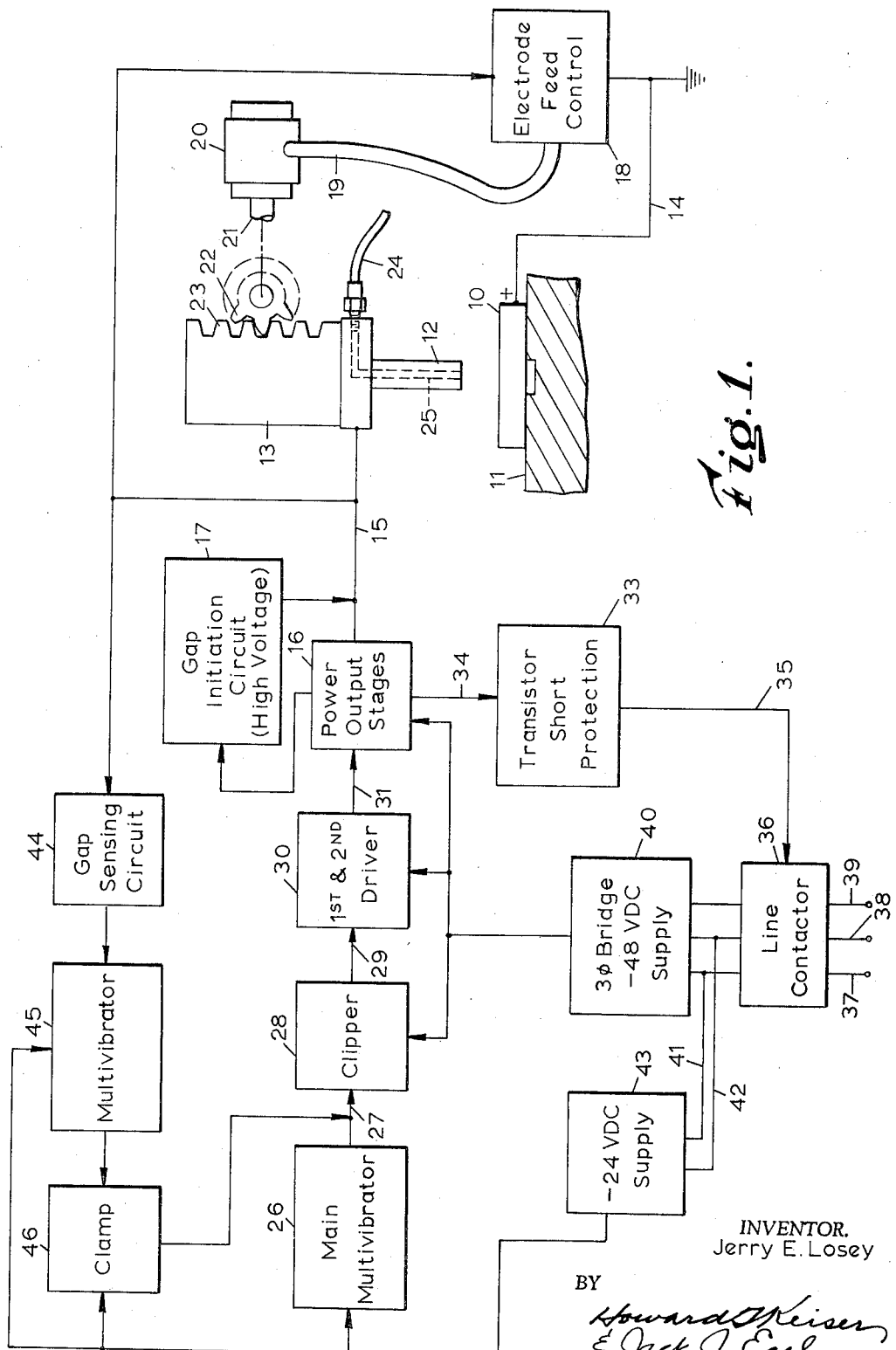
FIG. 1 is a block diagram of the power supply circuit for an EDM apparatus, the mechanical portions of the machine being shown in simplified form with the block diagram.

This invention is described herein as a combination of apparatus to provide the electrical discharge machining apparatus illustrated by the block circuit and simplified mechanism of FIG. 1. The apparatus is intended to machine a workpiece 10 which is supported on the machine base 11 and includes a tool electrode 12 attached to a ram 13 that is electrically insulated from the base 11. The ram 13 is movable toward and away from the base 11 to move the electrode 12 to and from the workpiece 10 which also acts as an electrode in the electrical circuit. As shown, the workpiece 10 is connected to ground potential by a conductive cable 14 while the electrode 12 is connected by means of a conductor 15 to a power output circuit 16 and a gap initiation circuit 17 which outputs high energy negative direct current pulses at a high frequency. Thus the tool electrode 12 is cathodic with respect to the anodic work 10 and when the two are brought into close proximity, sparks result and metal is removed from the workpiece 10 in the well known manner of EDM processes.

The feed rate, that is the velocity of movement of the tool electrode 12 through the workpiece 10, is under the control of a conventional feed control circuit 18 that monitors the voltage across the machining gap between the tool electrode 12 and workpiece 10. The feed circuit operates on the principles of servo mechanisms to maintain a constant average voltage across the gap and when this voltage drops toward zero potential, as when a direct short circuit occurs, the feed direction is reversed to withdraw the tool electrode 12 away from the workpiece 10. This will cause the average potential to rise and then with the potential rise, the tool is restarted toward the work. The feed control circuit 18 is connected by a cable 19 to a reversible feed motor 20 that drives the ram 13 up or down through a mechanical connection 21 terminating at a pinion 22 and rack 23 formed on the ram 13.

The process is normally carried out in a dielectric medium such as oil. Therefore a hose 24 is shown connected to the electrode 12 to supply the dielectric fluid under pressure to a central passage 25 through the electrode 12 from which it is discharged into the machining gap.

The frequency of the pulsating direct current for the machining is controlled by a free running multivibrator circuit 26 that outputs a series of pulses over a conductor 27 leading to a clipping circuit 28. The clipping circuit 28 clips these pulses at some level below that output from the multivibrator 26 to provide a series of pulses to an output line 29, each pulse of this series having a very fast rise time as a result of the clipping action. These pulses are passed over the line 29 to the driver stages 30 where they are amplified and subsequently applied over a conductor 31 to the output stage 16 which is a group of parallel current amplifiers supplying pulsating direct current to the line 15 at a high power level and at a frequency determined by the frequency of the free running multivibrator 26. These power pulses from the output stage 16 are of negative polarity for use in the spark machining process.

The performance of the output stage 16 is monitored by a short protection circuit 33 to which a voltage level output signal is connected by a conductor 34. When this voltage output does not return to a present low magnitude within a predetermined time, a signal is applied over a line 35 to a line current contactor unit 36 which serves as an overload circuit breaker that disconnects the three phase input lines 37, 38, 39 from the direct current voltage supply unit 40. It also disconnects the single phase connection via lines 41, 42 from a second direct current power supply 43. When the line contactor unit is operated to open the lines 37–39, the entire power supply circuitry is deenergized and cannot be reenergized except manually.

The servo feed system described tends to operate in a manner to provide protection against short circuiting of the tool electrode 12 and the work 10 since it operates in an inverse relationship with the gap voltage. When a tool-work short occurs, the voltage therebetween drops to a very low level, and therefore the servo system will begin to withdraw the tool electrode 12. The servo-feed system will be too slow normally to react in the case of a short circuit to pull the tool 12 back from the work 10 in time to protect against catastrophic damage to elements in the process.

In view of the protective shortcomings of the apparatus described thus far, additional safety circuitry is required in the system which is much faster in operation than the line contactor 36 and the feed control circuitry 18 and mechanism 20–23. This additional circuitry is provided in the present invention by three sections of circuitry including a gap sensing circuit 44, a multivibrator 45 and a clamping circuit 46, the details of these being shown in FIG. 2. It is the function of these circuits to test the quality of machining discharges at the gap and to turn off the pulsed electrical power to the gap temporarily if the quality is not up to the desired standard. Since many bad pulses are the result of temporary short circuit conditions, the novel protective circuit herein permits a preset number of bad discharges in succession before acting to turn off the power temporarily; for example, the circuit may be aligned to require three bad discharges in succession before the power to the gap is interrupted. The time for these three discharges to occur would be less than the normal time for the servo feed to react and reverse the feed so that the protective circuit of this invention affords protection over and above that inherent in the servo feed arrangement.

The gap sensing circuit 44 which tests the discharge quality includes a transistor Q4 which is turned on to conduct whenever the gap voltage reaches a preset level which is indicative of a good discharge. A short at the gap will prevent the voltage from reaching this level and therefore the transistor Q4 will not turn on to conduct. The feedback of each discharge voltage signal is applied from the line 15 to a dropping resistance R11 that limits the voltage input at the junction 47 to a specified value which will not cause damage to the transistor Q4 and its control circuit elements. A Zener diode D3 acts in a limiting manner also controlling the voltage at point 47 to a fixed maximum value. The Zener diode D3 has high frequency limitations and therefore a shunt path through a capacitor C3 and an asymmetric diode D4 are included to pass to ground the transient frequencies above the range of operation of the diode D3. The limited signal at point 47 is further attenuated by the resistances R9 and R10 and the resulting signal is applied to a tunnel diode D2 and to the base of the transistor Q4. The resistance R9 is a potentiometer which permits limited adjustment of the signal level connected to the elements D2 and Q4 to a selected value commensurate with proper functioning of the transistor Q4 with regard to a good and bad discharge detection function, that is it provides an adjustment of a fine nature of the level dividing good and bad discharges. The tunnel diode D2 acts in a snap action manner due to its negative voltage characteristic when a good pulse is detected to immediately drive the transistor Q4 full on. Upon each electrical pulse resulting in a good discharge, the transistor Q4 is turned on briefly by the signal applied to its base through the circuit described. A bad discharge is identified by a low voltage level and does not result in a signal sufficient to turn on the transistor Q4 to conduct.

Figure 2:
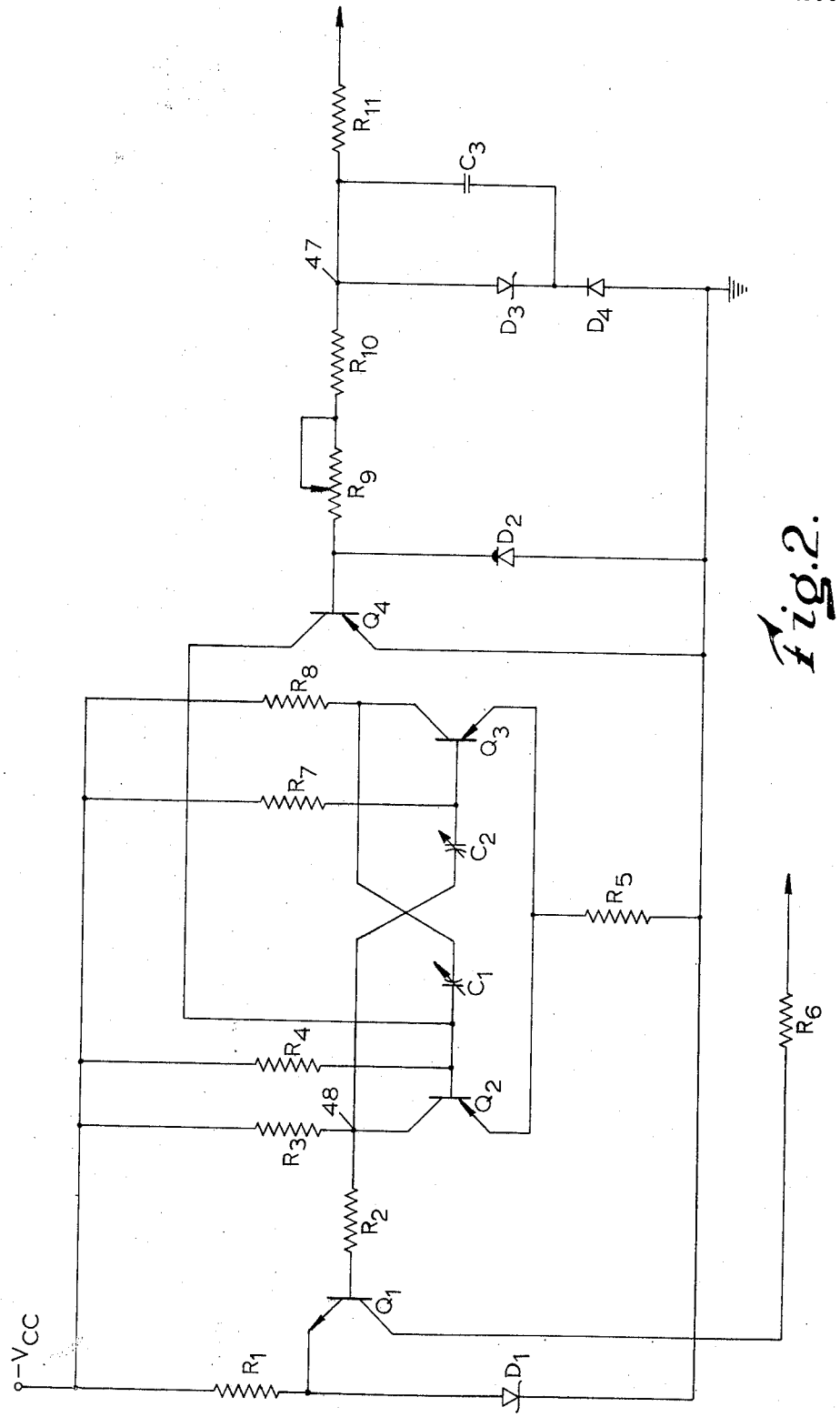
FIG. 2 is a detailed schematic diagram of a portion of the circuit of Fig. 1.

Whenever the transistor Q4 is caused to conduct, it produces a reset signal that is connected to the multivibrator 45 which is also shown in detail in FIG. 2. The multivibrator is of a conventional nature and includes the transistors Q2 and Q3, the resistances R3, R4, R5, R7 and R8 and the capacitors C1 and C2 which are adjustable to vary the on and off time relationship of the two valve elements Q2 and Q3. The resistance R5 produces a bias on the transistors Q2 and Q3 so that whenever the transistor Q4 is turned on the transistor Q3 is turned on to conduct defining the reset state of the multivibrator circuit 45.

Whenever the transistor Q2 is permitted to conduct, it causes a forward bias signal at point 48 that is applied through the resistance R2 to the base of a transistor Q1 of the clamp circuit 46. The clamp circuit 46 also includes a resistance R1 and a Zener diode D1 in series which apply a fixed bias on the transistor Q1 to hold it cut off except when the junction 48 is caused to change to the forward bias value, this occurring only when the transistor Q2 is turned on to conduct as described. The resistance R6 is in series between the transistor Q1 and the base of an amplifier transistor (not shown) in the clipper circuit 28. When the transistor Q1 is turned on it produces an output suppression signal which is used to bias the clipper circuit 28 to cut-off. Therefore, no pulses from the main multivibrator 26 are passed through to the circuit 28 and succeeding circuits, thus turning off the power to the gap.

The on and off time constants of the transistors Q2 and Q3 of the multivibrator 45 are such that with a constant series of good discharges, the transistor Q3 conducts constantly. Since the frequency of machining pulses is higher than the operating frequency of the multivibrator 45, the on time of the transistor Q3 is normally set so that a plurality of bad discharges in succession must be sensed before the multivibrator 45 is set and transistor Q2 conducts. When this occurs, the power is caused to be interrupted for a plurality of control pulse periods the frequency of discharges corresponding to the frequency of the control pulses from the multivibrator 26. The duration of this interruption extends for the normal on time of the transistor Q2. The transistor Q3 is thereafter turned on again and if the bad discharges persist the transistor Q2 is again turned on and the power to the gap is turned off. However, if the short or other condition has cleared, the normal machining will be resumed upon the resetting of the circuit 45. The number of successive bad discharges required before setting of the circuit 45 is adjustable by manipulation of the capacitor C1. The number of control pulse periods to pass before resetting after the transistor Q2 is turned on is adjustable by manipulation of the capacitor C2.

Figure 3:
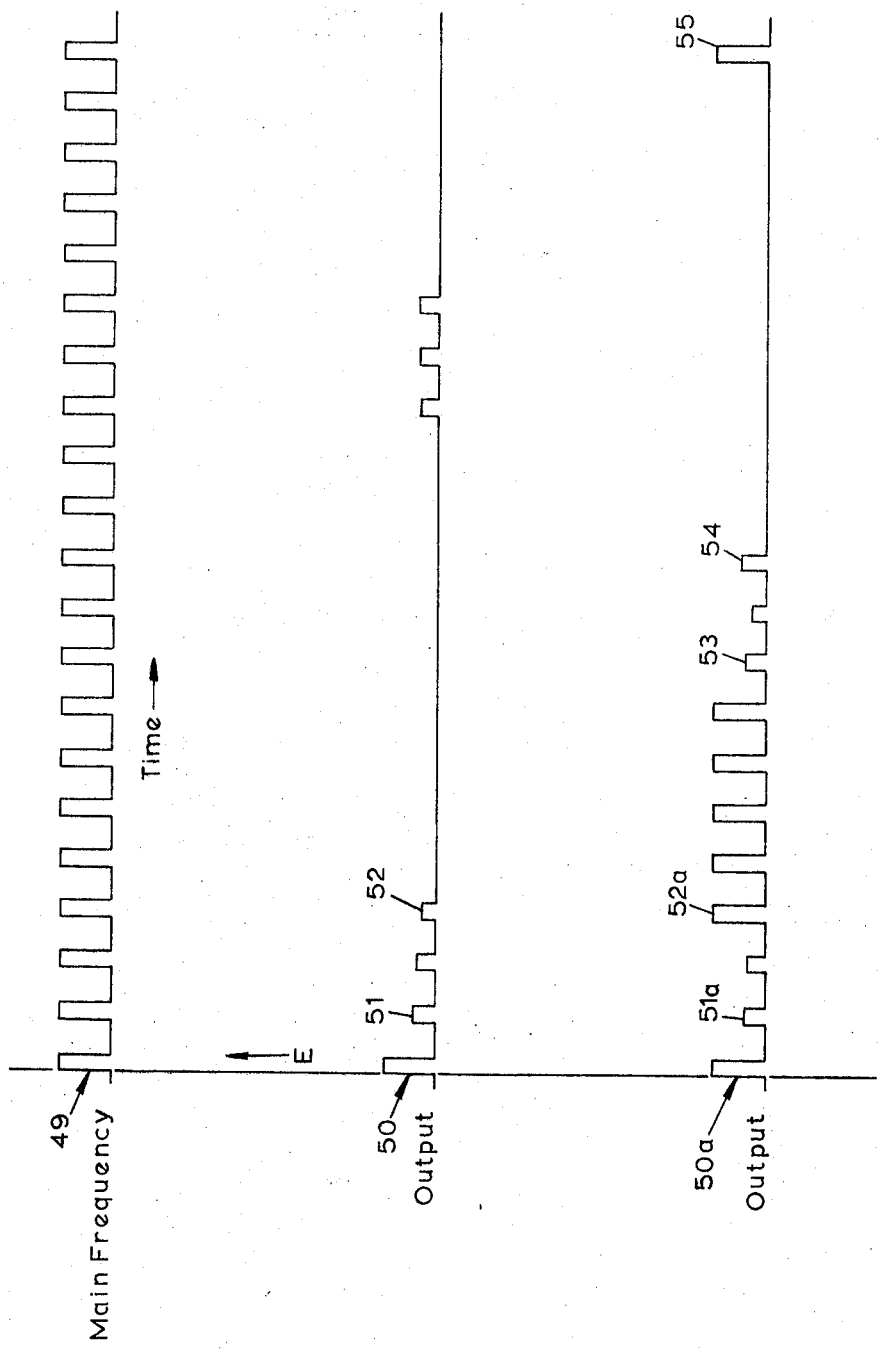
FIG. 3 is a timing diagram illustrating circuit conditions during a machining period.

The effect of the described circuitry is shown in the wave diagram of FIG. 3. The wave shape 49 represents the frequency control pulses from the main multivibrator 26 and when the machining is proceeding in a normal manner, the output power pulse wave shape to the machining gap will correspond to this wave shape also. This wave shape 49 is characterized by a uniform sequence of pulses occurring over a time span. The wave shape 50 shows one form that the voltage across the gap will take when power pulses are applied thereto and a sustained short circuit occurs during machining. For example, a short occurs at the pulse 51, indicated by the reduced ampltiude, and is not cleared within the normal on time of the transistor Q3, which is adjusted to conduct for three successive gap power pulse periods after which the transistor Q2 is turned on. Therefore after pulse 52, the gap output is suppressed for a period of nine power pulse periods corresponding to the conduction period to which the transistor Q2 is set. The multivibrator 45 then resets itself and transistor Q3 again conducts but the short persists and again after three bad discharges, the gap power pulses are interrupted. This operation will continue until the gap is cleared of the short, either by a withdrawal of the tool 25 by the feed servo control 18 or by a removal of the particle causing the short, if this is the case, by burn-out or by wash-out. At any rate, no tool or work damage will occur.

The output wave shape 50a illustrates another operation in which a bad discharge occurs at the pulse 51a but a good discharge occurs at the pulse 52a which resests the circuit 45 before it can set itself and suppress the machining pulses. Therefore normal gap power pulses and discharges continue to occur. At the pulse 53, a bad pulse condition is again sensed, and is sustained through the pulse 54 and thereafter the gap power pulses are interrupted for a nine pulse period count before the transistor Q3 is turned on to reset the multivibrator 45 and the gap pulses resume at pulse 55. Thus it can be seen that the circuits described provide adequate sustained short circuit gap protection while permitting the most efficient operation by the tolerance of short circuits resulting from minor causes that ordinarily are of brief duration and insufficient to cause permanent tool or work damage.

What is claimed is:

1. In an electrical machining apparatus having a pulse source and amplification circuitry responsive to the pulse source to produce machining discharges across a gap between electrodes including a conductive tool and a conductive workpiece, the improvement comprising:
    (a) means for sensing a good discharge signal when the gap voltage exceeds a predetermined level,
    (b) means for suppressing the application of pulses to the gap, and
    (c) a multivibrator having reset and set conditions, said sensing means operating to apply a reset signal thereto with each good discharge, said multivibrator having reset and set time periods each exceeding two gap pulse periods whereby at least two bad discharges in succession are required to permit said multivibrator to assume its set condition and at least two gap power pulses are suppressed thereafter.

2. The apparatus of claim 1 wherein:
    (a) said means for suppressing is a clamp circuit connected to said multivibrator and responsive to the set condition thereof to produce a suppression signal having a duration corresponding to the time extent of said set condition, and
    (b) means are provided for applying said suppression signal to said pulse source to preclude an output therefrom while said suppression signal is present.

3. The apparatus of claim 1 wherein:
    (a) means are provided in said multivibrator for selectively altering the reset and set time periods whereby the number of gap pulse periods can be adjusted in accordance with machining conditions and specific power supply requirements.

4. In an electrical machining apparatus having a power circuit including a main multivibrator outputing control pulses and power amplification circuits responding to said control pulses to apply electrical pulses producing machining discharges across a gap between electrodes including a conductive tool and workpiece, the combination comprising:
    (a) a voltage amplitude detection circuit connected across the gap and operable to output a good discharge signal when the gap voltage exceeds a predetermined level,
    (b) a second multivibrator circuit having reset and set conditions each having a time duration exceeding the time span of two successive control pulses,
    (c) means for connecting the good discharge signal as a reset signal to said second multivibrator for resetting thereof when each good discharge occurs at the gap,
    (d) an output switch device connected to said second multivibrator circuit and operated thereby to produce a suppression bias signal when said second multivibrator is in the set condition thereof, and
    (e) means for connecting said suppression bias signal to the power amplification circuits to suppress the control pulses therein and prevent application of electrical pulses to the gap for the duration of said suppression bias signal.

References Cited

UNITED STATES PATENTS

| | | | |
|---|---|---|---|
| 3,018,411 | 1/1962 | Webb | 315—205 X |
| 3,178,551 | 4/1965 | Webb | 219—69 |
| 3,213,319 | 10/1965 | Inoue | 219—69 X |

JOSEPH V. TRUHE, Primary Examiner

M. C. FLIESLER, Assistant Examiner